United States Patent [19]

Miyamura et al.

[11] Patent Number: 5,358,580
[45] Date of Patent: Oct. 25, 1994

[54] PROCESS FOR MANUFACTURING HOSE HAVING REINFORCEMENT INCORPORATED THEREIN AND APPARATUS THEREFOR

[75] Inventors: Masashi Miyamura; Isamu Nishida; Yoshihiro Nakagawa, all of Toyama, Japan

[73] Assignee: Toyox Co., Ltd., Japan

[21] Appl. No.: 90,499

[22] Filed: Jul. 12, 1993

[30] Foreign Application Priority Data

Feb. 2, 1993 [JP] Japan .................................. 5-037445

[51] Int. Cl.$^5$ ............................................. B29C 47/06
[52] U.S. Cl. ................... 156/143; 156/244.13; 156/244.14; 156/244.15; 156/244.18; 156/244.21; 156/244.24; 156/250; 156/255; 156/500; 156/510
[58] Field of Search ............... 156/143, 244.13, 244.14, 156/244.15, 244.18, 244.19, 244.21, 244.25, 255, 250, 500, 510

[56] References Cited

U.S. PATENT DOCUMENTS

| | | | |
|---|---|---|---|
| 3,669,824 | 6/1972 | Hess | 156/255 |
| 3,706,173 | 12/1972 | Taylor | 156/244.18 |
| 4,132,576 | 1/1979 | Neroni et al. | 156/143 |
| 4,473,525 | 9/1984 | Drori | 156/244.18 |
| 4,500,284 | 2/1985 | Lupke | 156/244.18 |
| 4,716,001 | 12/1987 | Kottke | 156/244.15 |
| 4,859,264 | 8/1989 | Buluschek | 156/244.18 |

*Primary Examiner*—Caleb Weston
*Attorney, Agent, or Firm*—Steinberg, Raskin & Davidson

[57] ABSTRACT

A hose manufacturing process and a method therefor capable of leading to an increase in production efficiency and productivity and improving configurational and dimensional stability of the hose. A die is provided for co-extruding a flexible synthetic resin material and a rigid synthetic resin material to concurrently form an inner tube of a small diameter and a reinforcement which is concentric with the inner tube and has a diameter larger than the inner tube, respectively. Also, a cutter is arranged forward of the die in a direction of extrusion of the reinforcement for cutting the reinforcement into a spiral shape. Further, a compression air feed passage is formed in the die so as to feed compressed air into the inner tube, to thereby expand it. This permits the inner tube to be contacted with the reinforcement for adhesion therebetween.

11 Claims, 3 Drawing Sheets

PROCESS FOR MANUFACTURING HOSE HAVING REINFORCEMENT INCORPORATED THEREIN AND APPARATUS THEREFOR

BACKGROUND OF THE INVENTION

This invention relates to a process for manufacturing a hose having a reinforcement incorporated therein and an apparatus therefor, and more particularly to a process for manufacturing a hose comprising an inner tube and a reinforcement spirally wound on an outer periphery of the inner tube and an apparatus therefor.

Conventionally, there has been proposed a hose which exhibits flexibility and resistance to bending. The hose includes an inner tube made of a soft or flexible synthetic resin material and a reinforcement made of a hard or rigid synthetic resin material and spirally wound on the inner tube.

Such a conventional hose may be typically manufactured according to, for example, such a method as disclosed in Japanese Patent Publication No. 15218/1978.

The conventional method disclosed comprises the step of injecting a flexible synthetic resin material from a first injection head to form an inner tube. Then, the inner tube is fed to a first winding station, where a wire winding step of spirally winding a wire made of polyamide on an outer periphery of the inner tube is practiced. The wire winding step is carried out while keeping a flexible core rod inserted into the inner tube as extruded from an extruder or applying a pressure of compressed air to an interior of the inner tube, to thereby prevent the inner tube from collapsing.

The inner tube on which the spiral polyamide wire is thus wound is then provided with a reinforcement in the next step. More particularly, the reinforcement is wound thereon with a strip made of a rigid polyvinyl chloride material and then corrugatedly fitted between turns of the spiral wire through the strip.

The conventional hose which is manufactured through the above-described steps continuously taking place is subsequently passed through a heated conduit to carrying out welding of the reinforcement and the like. Then, the hose is provided thereon with an outer tube by means of a second injection head, followed by being cooled at a cooling station, resulting in the method being completed.

Also, it is generally required that such a hose is formed into accurate dimensions in association with a connection element to which the hose is to be connected. However, when such a hose is to be formed of a flexible synthetic resin material into an increased diameter, it is highly difficult to provide the hose with stable and precise dimensions. In order to solve such a problem, techniques of spirally winding a melted strip-like flexible synthetic resin material on a core rod are employed. In this instance, an increase in manufacturing speed is carried out by rotating the core rod to continuously feed the core rod with the strip-like resin material.

However, rotation of the core rod causes the hose formed on the core rod and then separated therefrom to be still rotated. In this instance, rotation of the hose is obliged to be continued until it is cut into a length for desired applications. Therefore, manufacturing of the hose must be carried out while cooling it with water and floating it on the water.

In the first conventional hose manufacturing method disclosed in Japanese Patent Publication No. 15218/1978, as described above, the spiral wire is wound on the outside of the inner tube. For this purpose, a winding machine is arranged at the first winding station. Unfortunately, this causes a whole hose manufacturing apparatus to be complicated in structure and large-sized, leading to an increase in manufacturing cost.

Also, in the first conventional method disclosed in the Japanese publication, the step of forming the inner tube is carried out separate from the step of winding the reinforcement on the inner tube formed, resulting in the manufacturing being deteriorated in efficiency and productivity.

In the second conventional method described above wherein the strip-like synthetic resin material is wound on the core rod, it is required to arrange a water tank having a length corresponding to that of the hose cut for desired applications. Unfortunately, this leads to large-sizing of the hose manufacturing apparatus. Also, the method causes rotation of the hose formed to be forcibly continued until it is cut into a required length for desired applications, so that it is substantially impossible to carry out an operation of winding the manufactured hose on a bobbin or subjecting the hose to marking.

In addition, the second conventional method causes level different regions to occur on overlap portions of the strip-like synthetic resign material of the hose thus manufactured. The hose is often coated on an inner surface thereof with a special coating depending on the applications. Unfortunately, such level different regions fail to permit the coating to be satisfactorily formed on the regions.

Further, the level different regions each exhibit resistance to flowing of fluid in the hose, resulting in flowability of the fluid being deteriorated. Moreover, the level different regions are often worn, so that a synthetic resin material which forms the level different regions is mixed with the fluid, leading to contamination of the fluid.

SUMMARY OF THE INVENTION

The present invention has been made in view of the foregoing disadvantages of the prior art.

Accordingly, it is an object of the present invention to provide a process for manufacturing a hose having a reinforcement incorporated therein which is capable of accomplishing a significant increase in production efficiency and productivity.

It is another object of the present invention to provide a process for manufacturing a hose having a reinforcement incorporated therein which is capable of providing a hose with highly increased configurational and dimensional stability.

It is a further object of the present invention to provide an apparatus for manufacturing a hose having a reinforcement incorporated therein which is capable of significantly increasing the production efficiency and productivity.

It is still another object of the present invention to provide an apparatus for manufacturing a hose having a reinforcement incorporated therein which is capable of manufacturing a hose significantly stabilized in configuration and dimensions.

It is yet another object of the present invention to provide an apparatus for manufacturing a hose having a reinforcement incorporated therein which is capable of accomplishing a decrease in manufacturing cost and down-sized of the apparatus.

It is a still further object of the present invention to provide an apparatus for manufacturing a hose having a reinforcement incorporated therein which is capable of being highly simplified in structure.

In accordance with one aspect of the present invention, a process for manufacturing a hose having a reinforcement incorporated therein is provided. The method comprises the steps of co-extruding an inner tube of a flexible synthetic resin material and a reinforcement of a rigid synthetic resin material which is coaxial with the inner tube and has a diameter larger than the inner tube; cutting the reinforcement into a spiral shape which has turns spaced at predetermined intervals from each other concurrent with the co-extrusion; and expanding the inner tube to contact an outer periphery of the inner tube with an inside of the reinforcement, resulting in carrying out adhesion between the outer periphery of the inner tube and the inside of the spirally cut reinforcement.

In accordance with another aspect of the present invention, an apparatus for manufacturing a hose having a reinforcement incorporated therein is provided. The hose manufacturing apparatus comprises an extruder; a die arranged on the extruder so as to concurrently and separately extrude a flexible synthetic resin material and a rigid synthetic resin material, to thereby concurrently form an inner tube and a reinforcement which is concentric with the inner tube and has a diameter larger than the inner tube, respectively; a cutter arranged forward of the die in a direction of extrusion of the reinforcement so as to be rotated relatively to the reinforcement, to thereby cut the reinforcement into a spiral shape having turns spaced at predetermined intervals from each other; and a means for expanding the inner tube to a degree sufficient to permit an outer periphery of the inner tube to be contacted with an inside of the reinforcement.

Also, in accordance with this aspect of the present invention, there is provided an apparatus for manufacturing a hose having a reinforcement incorporated therein which comprises an extruder; a die arranged on the extruder so as to concurrently and separately extrude a flexible synthetic resin material and a rigid synthetic resin material, to thereby concurrently form an inner tube and a reinforcement which is concentric with the inner tube and has a diameter larger than the inner tube, respectively; a cutter arranged forward of the die in a direction of extrusion of the reinforcement so as to be rotated relatively to the reinforcement, to thereby cut the reinforcement into a spiral shape having turns spaced at predetermined intervals from each other; and an air feed means for feeding compressed air into the inner tube to expand the inner tube to a degree sufficient to permit an outer periphery of the inner tube to be contacted with an inside of the reinforcement.

Further, in accordance with this aspect of the present invention, there is provided an apparatus for manufacturing a hose having a reinforcement incorporated therein which comprises an extruder; a die arranged on the extruder so as to concurrently and separately extrude a flexible synthetic resin material and a rigid synthetic resin material, to thereby form an inner tube while expanding the inner tube into a final dimension of the inner tube and concurrently form a reinforcement which is concentric with the inner tube and has a diameter larger than the inner tube, respectively; and a cutter arranged forward of the die in a direction of extrusion of the reinforcement so as to be rotated relatively to the reinforcement, to thereby cut the reinforcement into a spiral shape having turns spaced at predetermined intervals from each other; whereby the inner tube is contacted with an inside of the spiral reinforcement.

In the present invention constructed as described above, the inner tube of a flexible synthetic resin and the reinforcement of a rigid synthetic resin are concurrently and separately formed by co-extrusion and the reinforcement is spirally cut into a spiral shape having turns spaced at predetermined intervals from each other while being extruded. Concurrently, the inner tube is expanded, resulting in the outer periphery of the inner tube being contacted with the inside of the spiral reinforcement, leading to adhesion between the inner tube and the reinforcement.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENTS

Now, the present invention will be described hereinafter with reference to the accompanying drawings.

Figure 1:
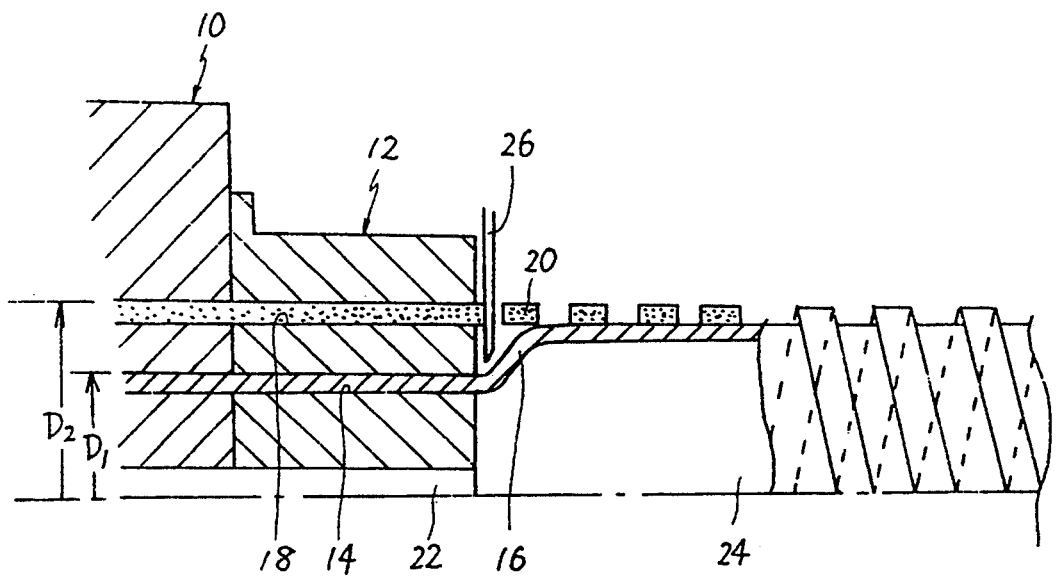
FIG. 1 is a fragmentary sectional view showing an essential part of an embodiment of an apparatus for manufacturing a hose having a reinforcement incorporated therein according to the present invention.

Referring first to FIG. 1, a first embodiment of a hose manufacturing apparatus or an apparatus for manufacturing a hose having a reinforcement incorporated therein according to the present invention is illustrated. A hose manufacturing apparatus of the illustrated embodiment includes an extruder which is generally designated at reference numeral 10 in FIG. 1 and adapted to simultaneously and separately extrude a flexible synthetic resin material and a rigid synthetic resin material. The hose manufacturing apparatus also includes a die 12 mounted on the extruder 10. The die 12 is formed therein with a first axially extending annular passage 14 for feeding a flexible synthetic resin material for an inner tube 16 therethrough and a second axially extending annular passage 18 through which a rigid synthetic resin material for a reinforcement 20 is fed. In the illustrated embodiment, the first annular passage 14 and second annular passage 18 are arranged so as to be concentric with each other and the second annular passage 18 is formed into a diameter $D_2$ larger than a diameter $D_1$ of the first annular passage 14.

Also, the die 12 is formed at a central portion thereof with an axially extending air passage 22 which is adapted to feed compressed air therethrough to an inner space 24 of the inner tube 16. For this purpose, the air passage 22 is arranged so as to communicate with a compressed air source (not shown).

The hose manufacturing apparatus of the illustrated embodiment also includes a cutter 26 arranged on an outlet side of the second annular passage 18 through which the resin material for the reinforcement 3 is extruded. The cutter 26 is positioned in a manner to be forwardly somewhat spaced from the die 12. The cutter 26 serves to cut the rigid synthetic resin material for the reinforcement 20 continuously extruded through the second annular passage 18 while revolving around the material, to thereby form the reinforcement 3. Such cutting of the rigid synthetic resin material by the cutter 26 permits the reinforcement 20 to be formed into a spiral shape having turns spaced by predetermined intervals from each other. It is a matter of course that the intervals between the turns of the spiral reinforcement 20 depend on a revolving speed of the cutter 26 and a speed at which the material for the reinforcement is extruded. For example, a decrease in revolving speed of the cutter 26 and an increase in speed of extrusion of the reinforcement material cause the intervals to be increased.

Now, the manner of operation of the hose manufacturing apparatus of the illustrated embodiment described above will be described hereinafter.

A melted flexible synthetic resin material for the inner tube 16 is extruded through the first annular passage 14 and concurrently a melted rigid synthetic resin material for the reinforcement 20 is extruded through the second annular passage 18, resulting in forming the inner tube 16 and reinforcement 20, respectively. A distal end of the inner tube 16 initially extruded is collapsed or closed with a stopper, to thereby prevent compressed air which is concurrently introduced into the inner tube 16 from leaking therefrom.

As described above, the materials for the inner tube 16 and reinforcement 20 are continuously and concurrently extruded while introducing compressed air into the inner tube 16. Concurrently, the rigid synthetic resin material for the reinforcement 20 which is extruded from an outlet of the second annular passage 18 is cut into a spiral shape by means of the cutter 26 being revolved, leading to formation of the spiral reinforcement 20.

As described above, a pressure of the compressed air is applied to the inner space or inside 24 of the cutter 26, so that the inner tube 16 may be expanded, to thereby be contacted with an inside of the spiral reinforcement 20. At this time, the inner tube 16 and reinforcement 20 each are just after extrusion, resulting in being still kept at an elevated temperature, which permits both elements 16 and 20 to be easily adhered to each other.

In this instance, the reinforcement 20 of the rigid synthetic resin material is rapidly stabilized in configuration and dimensions as compared with the inner tube 16 of the flexible synthetic resin material, so that adhesion of the inner tube 16 to the reinforcement 20 permits dimensions of the inner tube to be accurately specified.

Adhesion of the inner tube 16 to the reinforcement 20 takes place at a location forward of the cutter 26 in a direction of extrusion of the inner tube 16 and reinforcement 20, so that formation of the reinforcement 20 of a spiral shape which has turns kept spaced at predetermined intervals from each other is carried out before the adhesion takes place.

As described above, the first embodiment described above permits the cutter 26 to form the reinforcement 20 of a spiral shape which has turns spaced at predetermined intervals from each other. Also, compressed air fed through the air passage 22 of the die 12 is introduced into the inner space 24 of the inner tube 16 to expand the inner tube 16, resulting in the circumference or outer periphery of the inner tube 16 being contacted with the inside of the reinforcement 20, leading to adhesion between the inner tube 16 and the reinforcement 20. Thus, the illustrated embodiment permits formation of the inner tube 16 and winding of the reinforcement 20 on the inner tube 16 to be concurrently carried out.

Also, in the illustrated embodiment, the reinforcement 20 made of a rigid resin material is spirally mounted on the outer periphery of the inner tube 16 with the turns of the reinforcement 20 being kept spaced at predetermined intervals from each other, so that the configuration and dimensions of the inner tube 16 may be stabilized by the reinforcement 20. This can be accomplished irrespective of a diameter of the hose.

Thus, in the illustrated embodiment, the reinforcement 20 is spirally wound on the inner tube 16 in the course of extrusion of both elements, resulting in eliminating rotation of the hose required in the prior art wherein the strip-like flexible resin material is wound on the core rod, to thereby solve the above-described problems of the prior art due to rotation of the hose. Further, the illustrated embodiment eliminates arrangement of such a winding machine as required in the prior art, leading to simplification of the apparatus, down-sizing of the apparatus and a decrease in manufacturing cost of the apparatus.

Figure 2:
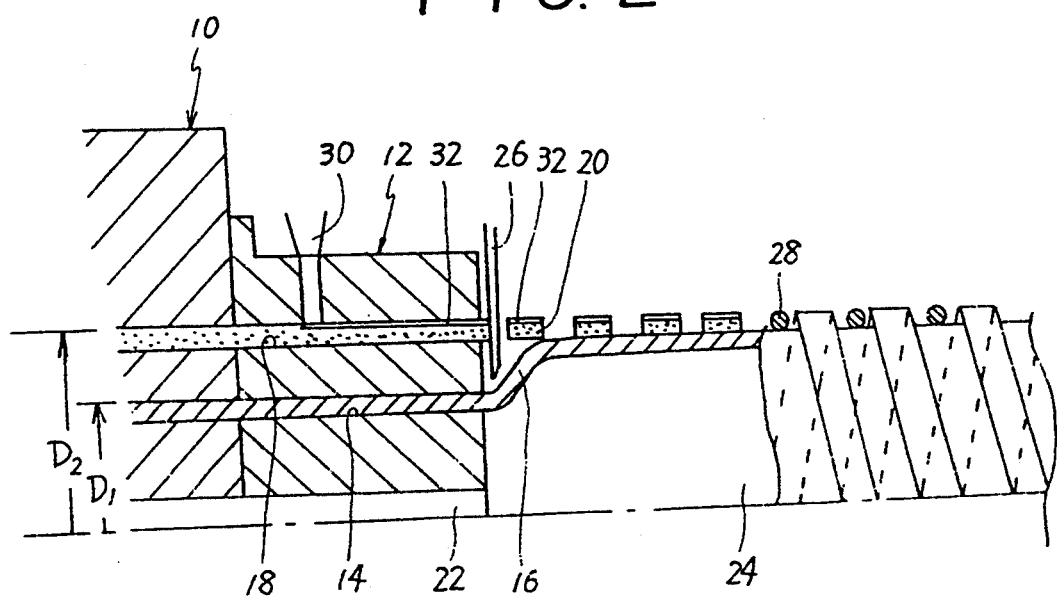
FIG. 2 is a fragmentary sectional view showing an essential part of another embodiment of an apparatus for manufacturing a hose having a reinforcement incorporated therein according to the present invention.
Figure 3:
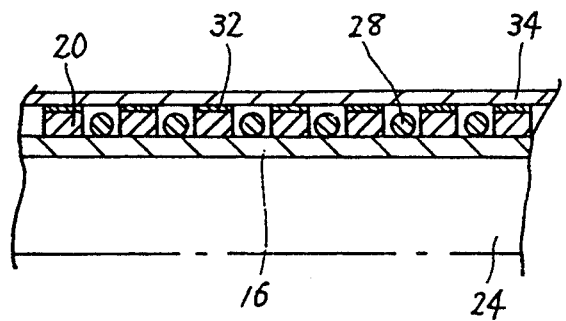
FIG. 3 is a fragmentary sectional view showing an outer tube and a reinforcement in the apparatus of FIG. 2.

Referring now to FIGS. 2 and 3, another embodiment of a hose manufacturing apparatus according to the present invention is illustrated. A hose manufacturing apparatus of the illustrated second embodiment is adapted to wind a coil 28 on an inner tube 16 at locations between each adjacent two turns of a spiral reinforcement 20. The apparatus includes a die 12 which is formed with an adhesive feed passage 30 in a manner to radially extend between an outer surface of the die 12 and a second annular passage 18 for feeding a rigid synthetic resin material for the reinforcement 20, resulting in an adhesive 32 being fed through the passage 30 to the second annular passage 18. The adhesive 32 is used for attaching an outer tube 34 (FIG. 3) to an outer periphery of the reinforcement 20.

For example, winding of the coil 28 on portions of the inner tube 16 defined between the turns of the reinforcement 20 by means of any suitable winding machine (not shown) may be carried out at a position of the reinforcement 20 which is spaced by a certain distance from the die 12. Unfortunately, this causes a surface of the reinforcement 20 and/or the outer tube 34 to be cooled before the winding is carried out, leading to a failure in thermal adhesion between the reinforcement 20 and the outer tube 34. The adhesive 32 is used for compensating such a failure in thermal adhesion therebetween, to thereby ensure adhesion therebetween.

The remaining part of the second embodiment may be constructed in substantially the same manner as the first embodiment described above with reference to FIG. 1.

In the first and second embodiments described above, compressed air is introduced from the air passage 22 into the inner tube 16 while keeping the distal end of the inner tube 16 collapsed or closed with the stopper. Alternatively, an air source (not shown) may be directly connected to the distal end of the inner tube 16, to thereby feed compressed air into the tube.

Figure 4:
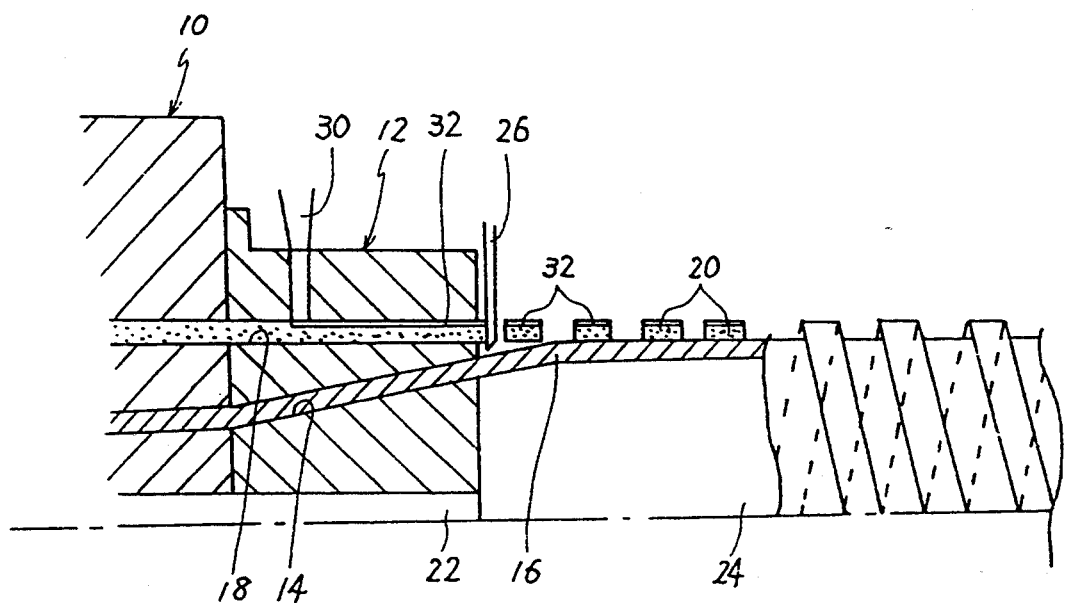
FIG. 4 is a fragmentary sectional view showing an essential part of a further embodiment of an apparatus for manufacturing a hose having a reinforcement incorporated therein according to the present invention.

Referring now to FIG. 4, a further or third embodiment of a hose manufacturing apparatus according to the present invention is shown. A hose manufacturing apparatus 10 of the third embodiment includes a die 12 formed with a first annular passage 14 for feeding a flexible synthetic resin material for an inner tube 16. The first annular passage 14 is formed in such a manner that a diameter thereof may be gradually enlarged in a direction of extrusion of the resin material. Such construction of the third embodiment permits the inner tube 16 to be contacted with an inside of a reinforcement 20 immediately after the inner tube 16 is formed by extrusion. The remaining part of the third embodiment may be constructed in substantially the same manner as the embodiment of FIG. 2.

Thus, the third embodiment permits the system for feeding the compressed air which is required in each of the first and second embodiments to be eliminated, to thereby contribute to simplification of the apparatus. Nevertheless, it is a matter of course that the third embodiment may be constructed so as to expand the inner tube 16 while feeding compressed air through an air passage 22 to the inner tube 16.

Figure 5:
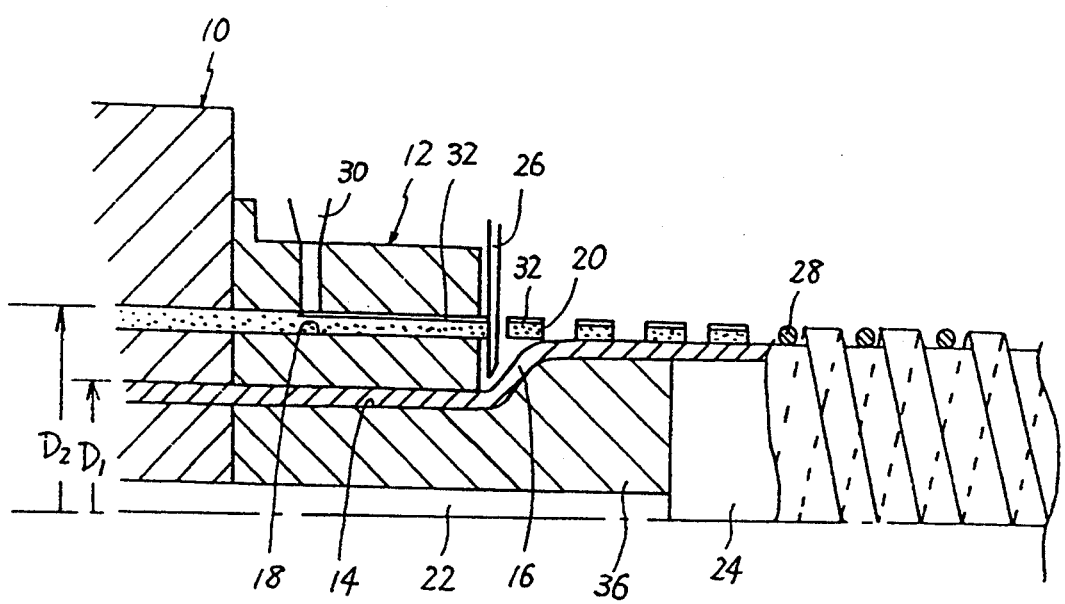
FIG. 5 is a fragmentary sectional view showing an essential part of still another embodiment of an apparatus for manufacturing a hose having a reinforcement incorporated therein according to the present invention.

FIG. 5 shows still another embodiment of a hose manufacturing apparatus according to the present invention, wherein a die 12 is provided with a guide section 36 in a manner to project forwardly therefrom. The guide section 36 is formed and arranged so as to permit an inner tube 16 formed due to extrusion of a flexible synthetic resin material to be expanded into a diameter sufficient to effectively contact an outer periphery of the inner tube with an inside of a reinforcement 20. Such construction of the fourth embodiment results in an inner diameter of the inner tube 16 being accurately defined or specified. Also, the fourth embodiment permits the inner tube to be expanded without any compressed air, to thereby significantly simplified in structure of the apparatus.

The remaining part of the fourth embodiment may be constructed in substantially the same manner as the embodiment of FIG. 2.

As can be seen from the foregoing, the present invention is so constructed that the inner tube and reinforcement are concurrently and separately formed by co-extrusion, the reinforcement is cut into a spiral shape while being extruded, and the inner tube is expanded, resulting in being adhered to the reinforcement. Such construction of the present invention permits formation of the inner tube and reinforcement and winding of the reinforcement on the inner tube to be concurrently carried out, leading to an increase in production efficiency and productivity.

Also, in the present invention, the rigid reinforcement is spirally mounted on the flexible inner tube in a continuous manner at predetermined intervals, so that the configuration and dimensions of the inner tube may be highly stabilized by the reinforcement. The present invention can exhibit the advantage irrespective of a diameter of a hose to be manufactured. This is due to the fact that the present invention fully eliminates a necessity of rotating the hose during the manufacturing as required in the prior art.

Further, the present invention is constructed so that the inner tube expanding means expands the inner tube to permit it to be contacted with the reinforcement, to thereby ensure positive adhesion between the inner tube and the reinforcement.

Moreover, the present invention eliminates arrangement of any winding machine which is required in the prior art, leading to a decrease in manufacturing cost and down-sizing of the apparatus.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A process for manufacturing a hose having a reinforcement incorporated therein, comprising the steps of:
    co-extruding an inner tube of a flexible synthetic resin material and a reinforcement of a rigid synthetic resin material which is coaxial with the inner tube and has a diameter larger than the inner tube;
    cutting the reinforcement into a spiral shape which has turns spaced at predetermined intervals from each other concurrent with the co-extrusion; and
    expanding the inner tube to contact an outer periphery of the inner tube with an inside of the reinforcement, resulting in carrying out adhesion between the outer periphery of the inner tube and the inside of the spirally cut reinforcement.

2. A process as defined in claim 1, wherein the step of cutting the reinforcement is carried out by means of a cutter arranged so as to revolve around the reinforcement.

3. An apparatus for manufacturing a hose having a reinforcement incorporated therein, comprising:
    an extruder;
    a die arranged on said extruder so as to concurrently and separately extrude a flexible synthetic resin material and a rigid synthetic resin material, to thereby concurrently form an inner tube and a reinforcement which is concentric with the inner tube and has a diameter larger than the inner tube, respectively;
    a cutter arranged forward of said die in a direction of extrusion of the reinforcement so as to be rotated relatively to the reinforcement, to thereby cut the reinforcement into a spiral shape having turns spaced at predetermined intervals from each other; and
    a means for expanding the inner tube to a degree sufficient to permit an outer periphery of the inner tube to be contacted with an inside of the reinforcement.

4. An apparatus as defined in claim 3, wherein said cutter is arranged so as to revolve around the reinforcement.

5. An apparatus as defined in claim 3, wherein said means for expanding the inner tube comprises an air feed means for feeding compressed air into the inner tube.

6. An apparatus as defined in claim 3, wherein said die is formed with a first annular passage for feeding the flexible synthetic resin material for the inner tube therethrough and a second annular passage through which the rigid synthetic resin material for the reinforcement is fed;

said second annular passage being arranged so as to be concentric with said first annular passage and formed into a diameter larger than said first annular passage.

7. An apparatus as defined in claim 6, wherein said die is provided with an adhesive feed passage in a manner to radially extend between an outer surface of said die and said second annular passage.

8. An apparatus as defined in claim 6, wherein said first annular passage is formed in a manner to be enlarged in a direction of extrusion of the inner tube, resulting in functioning also as said means for expanding the inner tube.

9. An apparatus as defined in claim 3, wherein said die is provided with a guide section which functions as said means for expanding the inner tube.

10. An apparatus for manufacturing a hose having a reinforcement incorporated therein, comprising:

an extruder;

a die arranged on said extruder so as to concurrently and separately extrude a flexible synthetic resin material and a rigid synthetic resin material, to thereby concurrently form an inner tube and a reinforcement which is concentric with the inner tube and has a diameter larger than the inner tube, respectively;

a cutter arranged forward of said die in a direction of extrusion of the reinforcement so as to be rotated relatively to the reinforcement, to thereby cut the reinforcement into a spiral shape having turns spaced at predetermined intervals from each other; and an air feed means for feeding compressed air into the inner tube to expand the inner tube to a degree sufficient to permit an outer periphery of the inner tube to be contacted with an inside of the reinforcement.

11. An apparatus for manufacturing a hose having a reinforcement incorporated therein, comprising:

an extruder;

a die arranged on said extruder so as to concurrently and separately extrude a flexible synthetic resin material and a rigid synthetic resin material, to thereby form an inner tube while expanding the inner tube into a final dimension of the inner tube and concurrently form a reinforcement which is concentric with the inner tube and has a diameter larger than the inner tube, respectively; and a cutter arranged forward of said die in a direction of extrusion of the reinforcement so as to be rotated relatively to the reinforcement, to thereby cut the reinforcement into a spiral shape having turns spaced at predetermined intervals from each other;

whereby the inner tube is contacted with an inside of the spiral reinforcement.

* * * * *